Patented Mar. 28, 1950

2,501,858

UNITED STATES PATENT OFFICE 2,501,858

4'(β-ETHYL)-MORPHOLINE ESTER OF NICOTINIC ACID AND ITS PRODUCTION

Hans Suter, Schaffhausen, Switzerland, assignor to Ciba Limited, Schaffhausen, Switzerland No Drawing. Application August 31, 1946, Serial No. 694,432. In Switzerland September 15, 1945

6 Claims. (Cl. 260—247)

The subject matter of the invention is a process for the production of the 4'-(β-ethyl)-morpholine ester of pyridine-3-carboxylic acid, which has been found to be a valuable therapeutic substance, more particularly one possessing, inter alia, good spasmolytic properties which is especially efficacious for suppressing neurogenic spasms. The process is characterised by the feature that a compound selected from the group consisting of nicotinic acid, its anhydride, a nicotinyl halide, an ester of nicotinic acid, or a salt of nicotinic acid, for example an alkali salt thereof, is caused to act upon 4-(β-hydroxyethyl)-morpholine or 4-(β-halogen-ethyl)-morpholine.

The invention also covers the new 4'-(β-ethyl)-morpholine ester of pyridine-3-carboxylic acid for the treatment of spasms.

Example 1

A mixture of 20 gms. of nicotinic acid and 21.3 gms. of 4-(β-hydroxy-ethyl)-morpholine in 100 gms. of xylene is heated at its boiling point, so that water formed in the reaction distils off slowly. As soon as 2.9 gms. of water have collected in the receiver, the remaining xylene is distilled off in vacuo. The oily residue, which consists of the 4'-(β-ethyl)-morpholine ester of pyridine-3-carboxylic acid, is purified by distillation in a good vacuum. Yield: 29.1 gms., corresponding to 82% of the theoretical. The product of the process is a colourless liquid which boils at 192 to 194° C. at a pressure of 17 mms. and is very soluble in water, methanol and ethanol.

Example 2

To a suspension of 14.6 gms. of sodium nicotinate in 200 c. c. of absolute ethanol are added 15.0 gms. of 4-(β-chlor-ethyl)-morpholine. The mixture is heated for 4 hours on the water bath under a reflux condenser, sodium chloride separating out slowly. The cooled reaction mixture is freed from the sodium chloride by filtration and the alcohol is distilled off. An oily residue remains which is purified by distillation under a good vacuum. Yield: 21.1 gms. of the 4'-(β-ethyl)-morpholine ester of pyridine-3-carboxylic acid, corresponding to 89.2% of the theoretical. The product of the process is a colourless liquid which boils at 192 to 194° C. at a pressure of 17 mms. and is very soluble in water, methanol and ethanol.

What I claim is:

1. A process for the production of the 4'-(β-ethyl)-morpholine ester of pyridine-3-carboxylic acid by reacting a compound selected from the group consisting of nicotinic acid esters and salts of nicotinic acid, with a compound selected from the group consisting of 4-(β-hydroxyethyl)-morpholine and 4-(β-halogenethyl)-morpholine.

2. A process for the production of the 4'-(β-ethyl)-morpholine ester of pyridine-3-carboxylic acid, comprising reacting nicotinic acid with 4-(β-hydroxy-ethyl)-morpholine.

3. A process for the production of the 4'-(β-ethyl)-morpholine ester of pyridine-3-carboxylic acid, comprising reacting an alkali salt of pyridine-3-carboxylic acid with a 4-(β-halogenethyl)-morpholine.

4. A process for the production of the 4'-(β-ethyl)-morpholine ester of pyridine-3-carboxylic acid, comprising reacting an alkali salt of pyridine-3-carboxylic acid with 4-(β-chlor-ethyl)-morpholine.

5. The 4'-(β-ethyl)-morpholine ester of pyridine-3-carboxylic acid.

6. A process for the production of 4'-(β-ethyl) morpholine ester of pyridine-3-carboxylic acid which comprises heating a mixture of nicotinic acid, 4-(β-hydroxy-ethyl) morpholine and xylene and distilling off the water formed in the reaction.

HANS SUTER.

REFERENCES CITED

The following references are of record in the file of this patent:

UNITED STATES PATENTS

| Number | Name | Date |
|---|---|---|
| 1,421,604 | Steffens | July 4, 1922 |
| 2,425,723 | Blicke | Aug. 19, 1947 |
| 2,430,116 | Holmes, et al. | Nov. 4, 1947 |

OTHER REFERENCES

J. A. C. S., vol. 53 (1931), pp. 2763–2769.

Blicke et al., J. Am. Chem. Soc., 64, 1721–1724 (1942), Jour. Organic Chem. (Jan., 1945) pp. 26–28.

Sidgwick, Organic Chemistry of Nitrogen, page 522.